Aug. 10, 1937.    L. A. MORRIS    2,089,400
TRAILER HITCH
Filed July 11, 1936    3 Sheets-Sheet 3
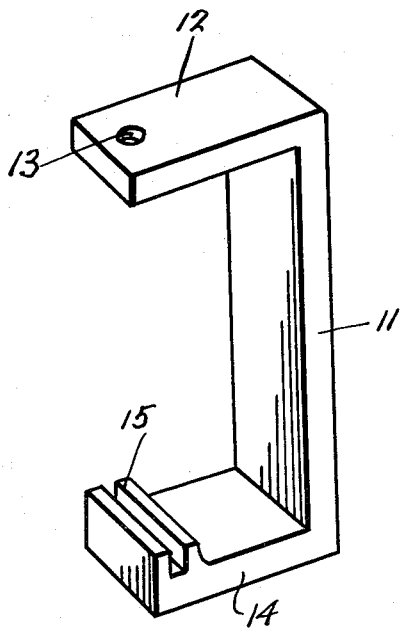
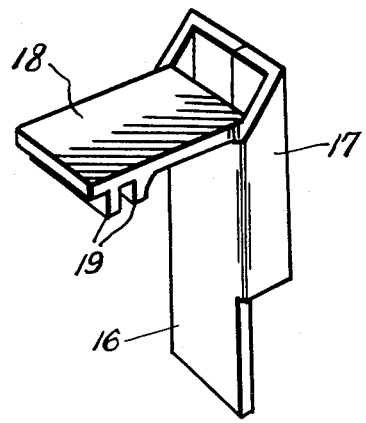
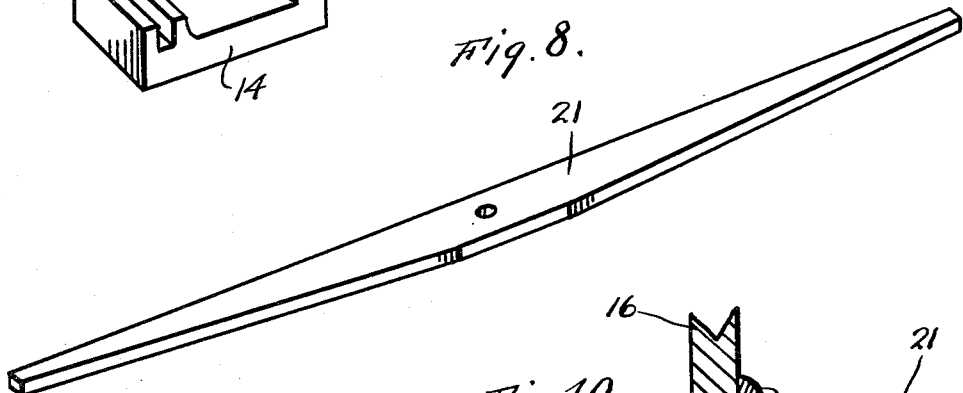
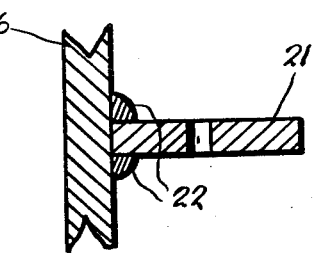
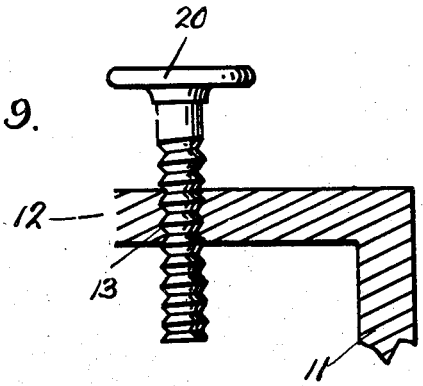
Inventor
L. A. Morris
By Clarence A. O'Brien and
Hyman Berman
Attorneys Patented Aug. 10, 1937

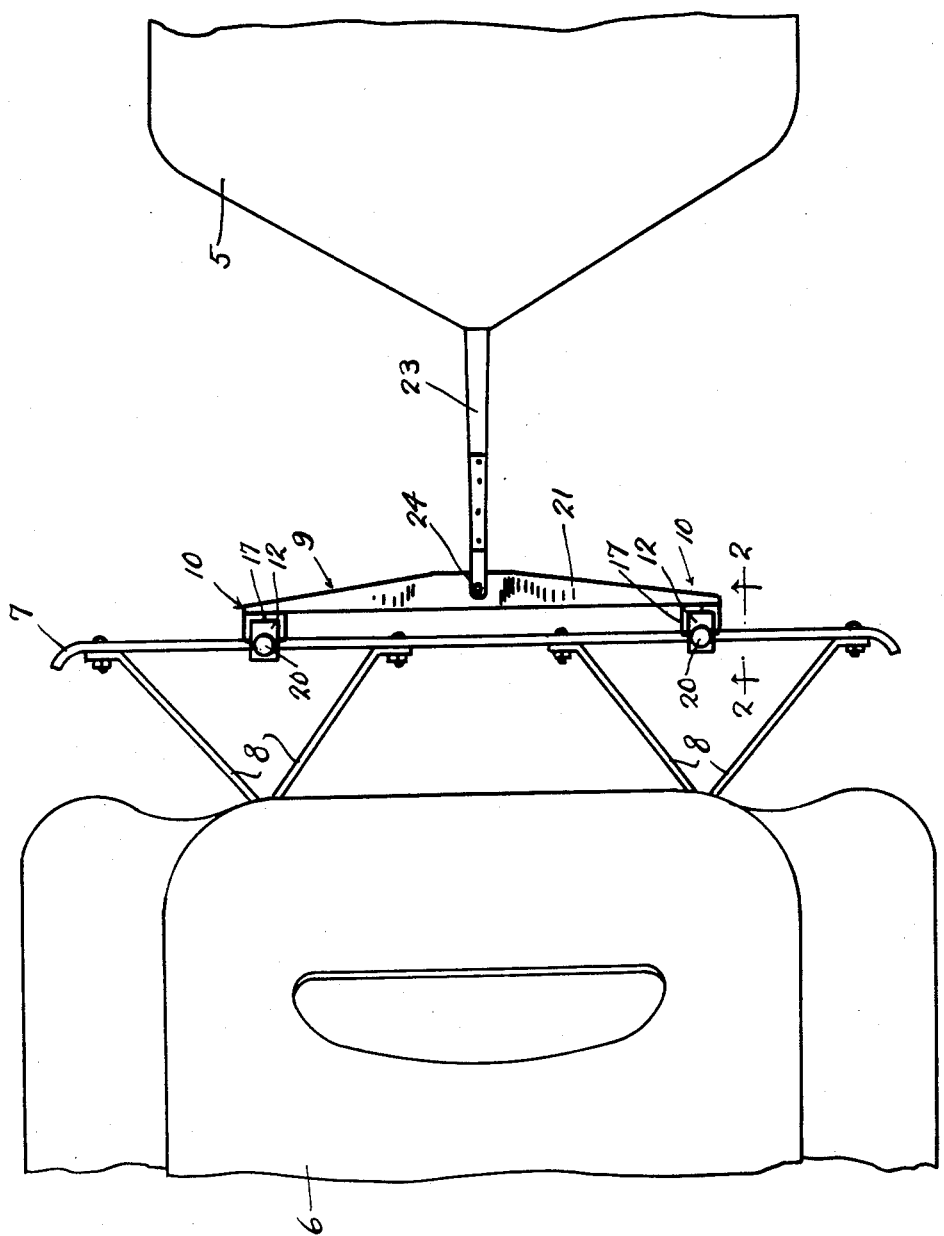

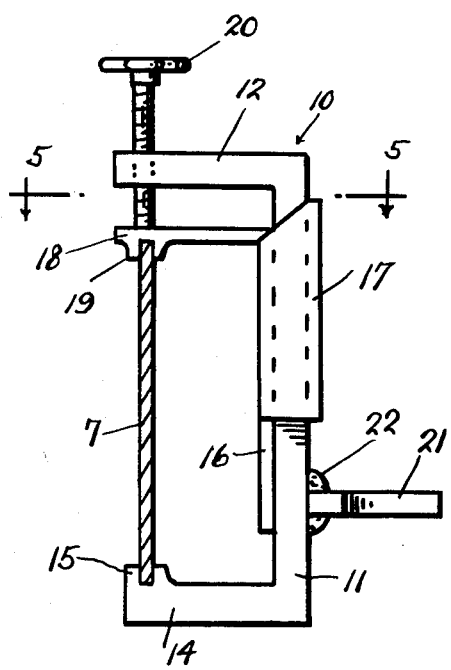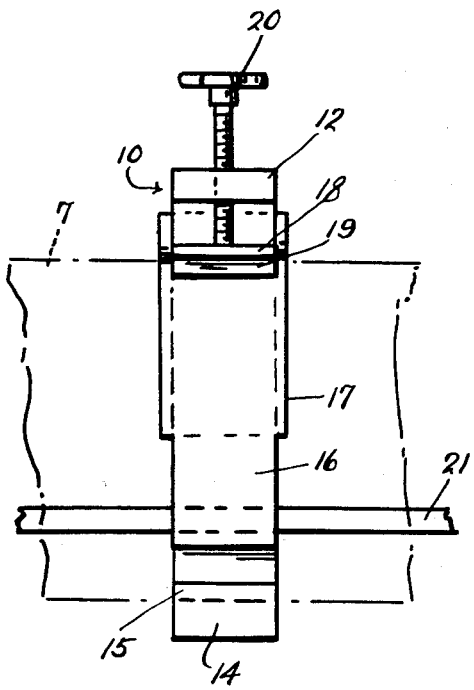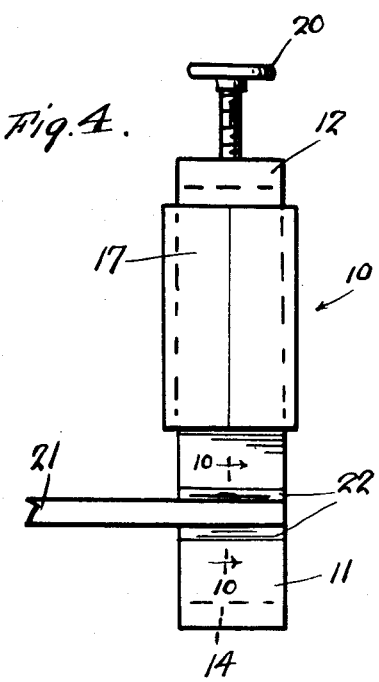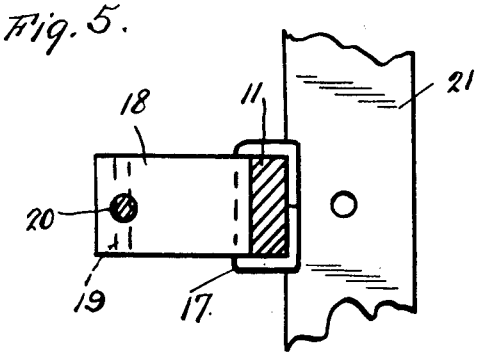

2,089,400

UNITED STATES PATENT OFFICE 2,089,400

TRAILER HITCH

Leland A. Morris, Pawnee Rock, Kans.

Application July 11, 1936, Serial No. 90,244

2 Claims. (Cl. 280—33.44)

This invention appertains to new and useful improvements in draft appliances, and more particularly to a hitch for trailers.

The principal object of the present invention is to provide a simple and inexpensive hitch whereby trailers can be attached to the rear bumpers of automobiles.

Another important object of the invention is to provide a hitch for trailers whereby trailers can be attached to the rear bumpers of lead vehicles such as conventional automobiles without in any way altering the automobile or bumper construction.

These and various other important objects and advantages of the invention will become apparent to the reader of the following specification.

In the drawings:

Figure 1 represents a fragmentary top plan view showing the hitch.

Figure 2 is a vertical sectional view on line 2—2 of Figure 1.

Figure 3 is a front elevational view of one of the clamps.

Figure 4 is a rear elevational view of one of the clamps.

Figure 5 is a horizontal sectional view on line 5—5 of Figure 2.

Figure 6 is a perspective view of one of the clamp sections.

Figure 7 is a perspective view of the clamp section complementary to the section shown in Figure 6.

Figure 8 is a perspective view of the connecting bar.

Figure 9 is a fragmentary vertical sectional view through the upper portion of the clamp shown in Figure 6 with the set screw in place.

Figure 10 is a fragmentary vertical sectional view taken substantially on line 10—10 of Figure 4.

Referring to the drawings, wherein like numerals designate like parts, it can be seen that numeral 5 represents the trailer while numeral 6 represents the lead vehicle which in the present case is an automobile equipped with the usual rear bumper bar 7 connected to the chassis of the automobile 6 by brace bars 8.

The hitch is generally referred to by numeral 9 and includes a pair of clamp assemblies 10—10 of like construction.

Each of these clamp structures consists of a pair of sections as shown in Figures 6 and 7. Each clamp consists of the sections shown in Figure 6 made up of the U-shaped structure 11 having the legs horizontally disposed. The upper leg 12 is provided with the vertical threaded opening 13 therein while the lower leg 14 is provided with the pair of upstanding ribs 15, thereon, between which the lower edge portion of the bumper bar 7 is disposed.

The complementary section shown in Figure 7 consists of the plate 16 having the rearwardly disposed guideway structure 17 thereon and the forwardly extending plate 18 at the upper end thereof from which depends the ribs 19 in close spaced relation between which the upper edge portion of the bumper 7 engages. The guideway 7 receives the vertical portion of the U-shaped clamp section 11, as suggested in Figure 5.

A set screw 20 is threaded down through the threaded opening 13 and when the clamp has been engaged over the bumper bar 7 in the manner suggested in Figure 2, the set screw 20 is driven downwardly against the top of the plate 18 so as to firmly clamp the structure to the bumper bar.

Numeral 21 represents an elongated connecting bar having tapered end portions which are welded to the lower portions of the clamp section plate 11 as denoted by the numeral 22.

The forward end of the tongue 23 of the trailer 5 is pivotally connected to the intermediate portion of the connecting bars 21 as at 24.

Thus, the trailer tongue is pivotally connected in an efficient manner to the bumper bar of the lead vehicle.

While the foregoing specification sets forth the invention in specific terms, it is to be understood that numerous changes in the shape, size, and materials can be resorted to without departing from the spirit and scope of the invention as claimed hereinafter.

Having described the invention, what is claimed as new is:

1. In combination, a lead vehicle having a rear bumper bar, a pair of spaced clamp members on the bumper bar, a connecting bar secured at its ends to the said clamps, a trailer, a tongue for the trailer, a pivotal connection between the forward end of the trailer and the intermediate portion of the connecting bar, each of the said clamp members consisting of a U-shaped member having its leg portions disposed horizontally, a plate having a guideway mountably receiving the vertical portion of the U-shaped section, said last-mentioned plate being provided with a forwardly extending plate underlying the upper leg of the U-shaped section, means on the under side of the forwardly extending plate and the top side of the lower leg of the U-shaped section for receiving the upper and lower edges of a bumper bar, and a screw threaded downwardly through the upper leg of the U-shaped section for exerting pressure against the top side of the forwardly extending plate.

2. In combination, a lead vehicle having a rear bumper bar, a clamp member on the bumper bar, said clamp member including a vertical member having forwardly extending leg members, the lower leg member being provided with a horizontal groove therein for receiving the lower edge portion of the bumper bar, and a clamp bolt disposed through the upper leg and engaging a movable means for connection with the bumper bar, said vertical member being provided with means whereby attachment may be made to a trailer.

LELAND A. MORRIS.